US012651004B2

(12) United States Patent
Kondo et al.

(10) Patent No.: US 12,651,004 B2
(45) Date of Patent: Jun. 9, 2026

(54) DATA REPLICATION SYSTEM AND DATA REPLICATION METHOD

(71) Applicant: Hitachi Vantara, Ltd., Yokohama (JP)

(72) Inventors: Yuichiro Kondo, Tokyo (JP); Goro Kazama, Tokyo (JP); Takeyuki Imadu, Tokyo (JP); Natsumi Akiba, Tokyo (JP)

(73) Assignee: Hitachi Vantara, Ltd., Kanagawa-Ken (JP)

( * ) Notice: Subject to any disclaimer, the term of this patent is extended or adjusted under 35 U.S.C. 154(b) by 0 days.

(21) Appl. No.: 18/825,209

(22) Filed: Sep. 5, 2024

(65) Prior Publication Data

US 2025/0231961 A1 Jul. 17, 2025

(30) Foreign Application Priority Data

Jan. 12, 2024 (JP) ................................. 2024-002936

(51) Int. Cl.
*G06F 16/27* (2019.01)
*G06F 11/1446* (2026.01)

(52) U.S. Cl.
CPC .......... *G06F 16/27* (2019.01); *G06F 11/1458* (2013.01); *G06F 2201/805* (2013.01)

(58) Field of Classification Search
CPC ...... G06F 16/27; G06F 16/273; G06F 16/275; G06F 16/278; G06F 11/1458; G06F 2201/805; G06F 11/1469
USPC ....................................................... 707/634
See application file for complete search history.

(56) References Cited

U.S. PATENT DOCUMENTS

2008/0184068 A1* 7/2008 Mogi .................. G06F 11/1469
714/15
2023/0185673 A1* 6/2023 Nishiyama .......... G06F 11/1451
711/162

FOREIGN PATENT DOCUMENTS

JP 2005-182588 A 7/2005
JP 2008-181274 A 8/2008
JP 2023-085644 A 6/2023

OTHER PUBLICATIONS

Japanese Office Action issued on Sep. 24, 2025 for Japanese Patent Application No. 2024-002936.

* cited by examiner

*Primary Examiner* — Michael Pham
(74) *Attorney, Agent, or Firm* — Volpe Koenig

(57) ABSTRACT

Provided is a control device which extracts summary information regarding an outline of a predetermined volume from volume mapping information regarding a configuration of a predetermined volume at a time point when each of backup images of a plurality of generations is created, and verifies whether a volume configuration based on a backup image of a specific generation corresponding to specific volume mapping information of a predetermined volume corresponding to a specific backup generation selected from the backup images of the plurality of generations on the basis of the summary information matches a volume configuration based on a current backup image of the predetermined volume, and when both the volume configurations match each other as a result of the verification, verifies and recovers backup data on the basis of the backup image of the specific generation.

7 Claims, 16 Drawing Sheets

*FIG. 3*

| (ATTIME)<br>BACKUP ACQUISITION<br>DATE AND TIME | OPEN STORAGE<br>VOLUME ID | MAIN FRAME STORAGE<br>VOLUME ID |
|---|---|---|
| 2022-01-01 09:00:00 | 101 | 1001, 1002, 1003, 1004 |
| | 102 | 2001, 2002, 2003, 2004 |
| | 103 | 3001, 3002, 3003, 3004 |
| ... | | |

*FIG. 4*

| STORAGE ID | VOLUME ID | ... | (AT TIME) BACKUP ACQUISITION DATE AND TIME | ... | NUMBER OF MAIN FRAME VOLUMES | TOTAL CAPACITY OF MAIN FRAME VOLUMES |
|---|---|---|---|---|---|---|
| 800000020000 | 101 | | 2022-01-01 09:00:00 | | 2000 | 2 |
| | | | 2022-01-03 09:00:00 | | 4000 | 4 |
| | | | 2022-01-05 09:00:00 | | 6000 | 6 |
| ... | | | | | | |

| (ATTIME) BACKUP ACQUISITION DATE AND TIME | ... | NUMBER OF EXPORT VOLUMES | NUMBER OF VOLUMES ON MAIN FRAME SIDE | TOTAL CAPACITY [TB] |
|---|---|---|---|---|
| 2022-01-01 09:00:00 | | 3 | 9000 | 9 |
| 2022-01-03 09:00:00 | | 3 | 18000 | 18 |
| 2022-01-05 09:00:00 | | 3 | 27000 | 27 |

FIG. 13

| (ATTIME) BACKUP ACQUISITION DATE AND TIME | GROUP LABEL | MAIN FRAME STORAGE VOLUME ID |
|---|---|---|
| 2022-01-01 09:00:00 | Group_A | 1001, 1002, 2001 |
| | Group_B | 1003, 1004, 2002, 2003, 2004, 3004 |
| | Group_C | 3001, 3002, 3003 |
| ... | | |

FIG. 14

| (ATTIME) BACKUP ACQUISITION DATE AND TIME | GROUP LABEL | MAIN STORAGE VOLUME ID | OPEN STORAGE VOLUME ID |
|---|---|---|---|
| 2022-01-01 09:00:00 | Group_A | 1001, 1002, 2001 | 101, 102 |
| | Group_B | 1003, 1004, 2002, 2003, 2004, 3004 | 101, 102, 103 |
| | Group_C | 3001, 3002, 3003 | 103 |
| ... | | | |

FIG. 16

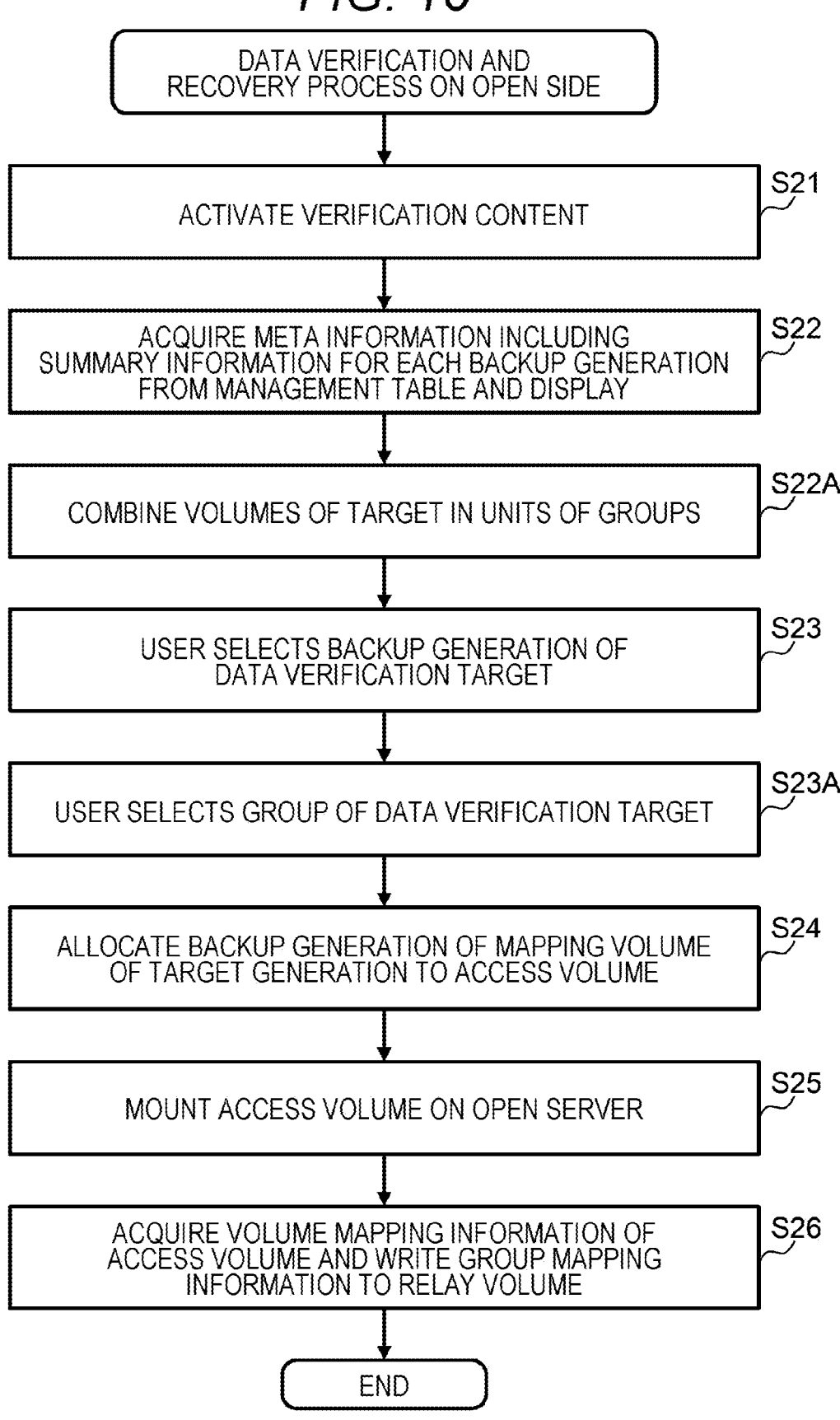

DATA VERIFICATION AND
RECOVERY PROCESS ON OPEN SIDE

ACTIVATE VERIFICATION CONTENT — S21

ACQUIRE META INFORMATION INCLUDING
SUMMARY INFORMATION FOR EACH BACKUP GENERATION
FROM MANAGEMENT TABLE AND DISPLAY — S22

COMBINE VOLUMES OF TARGET IN UNITS OF GROUPS — S22A

USER SELECTS BACKUP GENERATION OF
DATA VERIFICATION TARGET — S23

USER SELECTS GROUP OF DATA VERIFICATION TARGET — S23A

ALLOCATE BACKUP GENERATION OF MAPPING VOLUME
OF TARGET GENERATION TO ACCESS VOLUME — S24

MOUNT ACCESS VOLUME ON OPEN SERVER — S25

ACQUIRE VOLUME MAPPING INFORMATION OF
ACCESS VOLUME AND WRITE GROUP MAPPING
INFORMATION TO RELAY VOLUME — S26

END

GROUP SELECTION SCREEN

| | GROUP LABEL | DESCRIPTION | NUMBER OF EXPORT VOLUMES | NUMBER OF VOLUMES ON MAIN FRAME SIDE | TOTAL CAPACITY [TB] |
|---|---|---|---|---|---|
| ☑ | Group_A | (DETAILED DESCRIPTION REGARDING Group_A) | 2 | 3000 | 3 |
| ☑ | Group_B | (DETAILED DESCRIPTION REGARDING Group_B) | 3 | 4000 | 4 |
| ☐ | Group_C | (DETAILED DESCRIPTION REGARDING Group_C) | 1 | 2000 | 2 |
| 201a | 201b | 201c | 201d | 201e | 201f |

DATA REPLICATION SYSTEM AND DATA REPLICATION METHOD

BACKGROUND OF THE INVENTION

1. Field of the Invention

The present invention relates to a data replication system and a data replication method, and is preferably applied to, for example, a data replication system related to a technology for restoring backup data after data verification is performed.

2. Description of the Related Art

For example, there is a technology disclosed in JP 2023-85644 A as a technology for recovering a volume to a state before a cyberattack. JP 2023-85644 A discloses a technology of storing a plurality of generations of volumes as a backup image in a data protection area inaccessible from the outside in a storage device, storing a copy of one generation selected from the plurality of generations in an access volume accessible from the outside, and restoring the backup data of the selected one generation. The technology described in JP 2023-85644 A is based on the premise that the capacity of the volume is not expanded during the system operation, particularly in the middle of the backup cycle.

SUMMARY OF THE INVENTION

In the technology described in JP 2023-85644 A, when the capacity of the volume is expanded in the middle of the backup cycle, thereafter, consistency between the volume configuration of the main frame (hereinafter referred to as "MF") at the time of backup and the volume configuration of the MF at the time of data verification cannot be guaranteed, and even if data verification is performed as to whether both the volume configurations match each other, both the volume configurations do not match each other, so that backup data cannot be recovered in some cases.

The present invention has been made in view of the above points, and an object of the present invention is to propose a data replication system and a data replication method capable of recovering backup data after data verification even when a capacity of a volume is expanded in the middle of a backup cycle.

In order to solve such a problem, the present invention includes: a first storage device which creates a backup image of a predetermined volume on which data is read and written by an external device; a second storage device which accumulates backup images of a plurality of generations created at different time points with respect to the predetermined volume in a data protection area inaccessible from the external device; and a control device which extracts summary information regarding an outline of the predetermined volume from volume mapping information regarding a configuration of the predetermined volume at a time point when each of backup images of the plurality of generations is created, and acquires specific volume mapping information of the predetermined volume corresponding to a specific backup generation selected from the backup images of the plurality of generations on the basis of the summary information, and the control device verifies whether a volume configuration based on a backup image of the specific generation corresponding to the specific volume mapping information matches a volume configuration based on a current backup image of the predetermined volume, and when both the volume configurations match each other as a result of the verification, verifies and recovers backup data on the basis of the backup image of the specific generation.

In addition, in the present invention includes: a storing step of creating, by a first storage device, a backup image of a predetermined volume on which data is read and written by an external device; accumulating, by a second storage device, backup images of a plurality of generations created at different time points with respect to the predetermined volume in a data protection area inaccessible from the external device; extracting, by a control device, summary information regarding an outline of the predetermined volume from volume mapping information regarding a configuration of the predetermined volume at a time point when each of backup images of the plurality of generations is created; and acquiring, by a control device, specific volume mapping information of the predetermined volume corresponding to a specific backup generation selected from the backup images of the plurality of generations on the basis of the summary information, and the control device verifies whether a volume configuration based on a backup image of the specific generation corresponding to the specific volume mapping information matches a volume configuration based on a current backup image of the predetermined volume, and when both the volume configurations match each other as a result of the verification, verifies and recovers backup data on the basis of the backup image of the specific generation.

According to the present invention, even when a capacity of a volume is expanded in the middle of a backup cycle, backup data can be recovered after data verification.

BRIEF DESCRIPTION OF THE DRAWINGS

FIG. 2 is a block diagram illustrating an example of a hardware block configuration of a storage device or the like;

FIG. 3 is a diagram illustrating an example of volume mapping information corresponding to a volume configuration;

FIG. 4 is a diagram illustrating an example of a management table of a management table volume;

FIG. 10 is a diagram illustrating an example of a selection screen including summary information;

FIG. 13 is a diagram illustrating an example of group mapping information illustrated in FIG. 12;

FIG. 14 is a diagram illustrating an example of combined mapping information illustrated in FIG. 12;

FIG. 16 is a flowchart illustrating an example of a procedure of the data verification and recovery process on the open side; and FIG. 17 is a view illustrating an example of a group selection screen.

DESCRIPTION OF THE PREFERRED EMBODIMENTS

Figure 1:
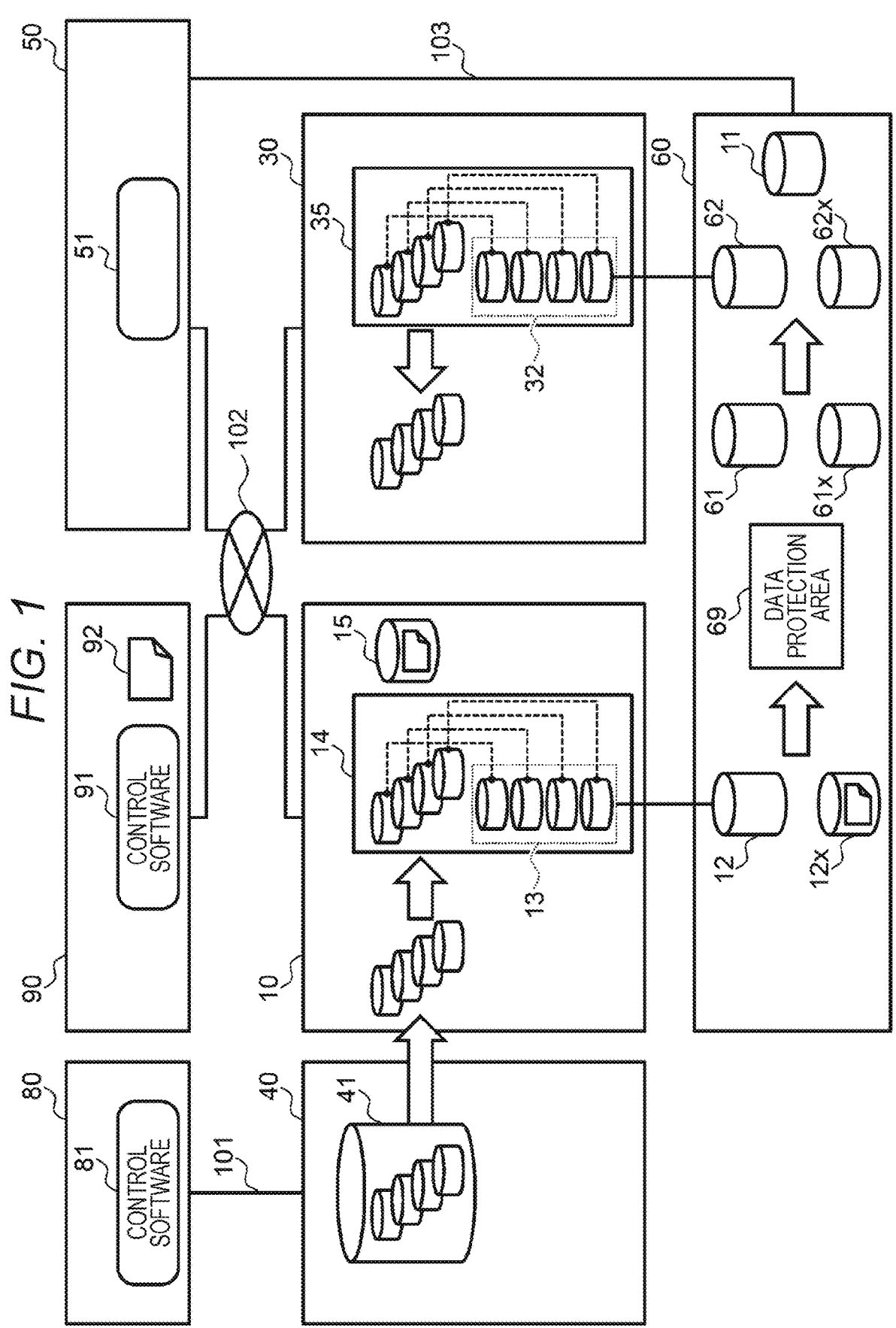
FIG. 1 is a block diagram illustrating an example of an overall configuration of a data replication system according to a first embodiment.

Hereinafter, embodiments of the present invention will be described with reference to the drawings. The embodiments are examples for describing the present invention, and are omitted and simplified as appropriate for the sake of clarity of description. The present invention can be implemented in various other forms. Unless otherwise specified, each component may be singular or plural.

The position, size, shape, range, and the like of each component illustrated in the drawings may not represent the actual position, size, shape, range, and the like in order to facilitate understanding of the invention. Therefore, the present invention is not necessarily limited to the position, size, shape, range, and the like disclosed in the drawings.

Examples of various types of information may be described in terms of expressions such as "table", "list", and "queue", but various types of information may be expressed in a data structure other than these. For example, various types of information such as "XX table", "XX list", and "XX queue" may be "XX information". In describing the identification information, expressions such as "identification information", "identifier", "name", "ID", and "number" are used, but these can be replaced with each other.

In a case where there are a plurality of components having the same or similar functions, the same reference numerals may be attached with different subscripts for description. In addition, in a case where it is not necessary to distinguish the plurality of components, the description may be given with the subscript omitted.

In the embodiments, a process performed by executing a program may be described. Here, a computer executes the program by a processor (for example, a CPU, a GPU), and performs a process defined by the program using a storage resource (for example, a memory), an interface device (for example, a communication port), and the like. Therefore, the subject of the process performed by executing the program may be a processor. Similarly, the subject of the process performed by executing the program may be a controller, a device, a system, a computer, or a node having a processor. The subject of the process performed by executing the program may be an arithmetic unit, or may include a dedicated circuit that performs a specific process. Here, the dedicated circuit is, for example, a field programmable gate array (FPGA), an application specific integrated circuit (ASIC), a complex programmable logic device (CPLD), or the like.

The program may be installed on the computer from a program source. The program source may be, for example, a program distribution server or a computer-readable storage medium. When the program source is a program distribution server, the program distribution server may include a processor and a storage resource that stores a distribution target program, and the processor of the program distribution server may distribute the distribution target program to another computer. In addition, in the embodiments, two or more programs may be realized as one program, or one program may be realized as two or more programs.

In addition, in the following description, a "host computer (host)" and a "computer system" are systems including one or more physical computers. The physical computer may be a general-purpose computer or a dedicated computer. The physical computer may function as a computer (for example, referred to as a host computer or a server system) that issues an input/output (I/O) request, or may function as a computer (for example, a storage device) that performs I/O of data in response to the I/O request.

In addition, the computer system may be a distributed system including one or more (typically, a plurality of) physical node devices. The physical node device is a physical computer.

In addition, by a physical computer (for example, a node device) executing predetermined software, software defined anything (SDx) may be constructed in the physical computer or a computer system including the physical computer. As the SDx, for example, software defined storage (SDS) or software defined data center (SDDC) may be adopted.

For example, a storage system as SDS may be constructed by executing software having a storage function by a physical general-purpose computer.

In addition, at least one physical computer (for example, a storage device) may be executed by one or more virtual computers as a server system and a virtual computer as a storage controller (typically, a device that inputs and outputs data to and from a PDEV unit in response to an I/O request) of the storage system.

In other words, such at least one physical computer may have both a function as at least a part of the server system and a function as at least a part of the storage system.

In addition, the computer system (typically, the storage system) may have a redundant configuration group. The redundant configuration may be configured by a plurality of node devices such as Erasure Coding, Redundant Array of Independent Nodes (PAIN), and mirroring between nodes, or may be configured by a single computer (for example, a node device) such as one or more redundant array of independent (or inexpensive) disks (RAID) groups as at least a part of the PDEV unit.

In addition, in the following description, an identification number is used as identification information of various targets, but identification information of a type other than the identification number (for example, an identifier including an alphabetic character or a code) may be adopted.

Hereinafter, the embodiments will be described in detail with reference to the drawings.

FIG. 1 is a block diagram illustrating an example of an overall configuration of a data replication system according to a first embodiment. The data replication system includes a primary main frame 80, a secondary main frame 90, a production storage device 40, a backup storage device 10, a verification storage device 30, an open server 50, and an open storage device 60. Note that in the following description, the primary main frame 80, the secondary main frame 90, the production storage device 40, the backup storage device 10, and the verification storage device 30 are collectively referred to as "main frame side", and the open server 50 and the open storage device 60 are collectively referred to as "open side". The primary main frame 80, the secondary main frame 90, and the open server 50 can also be referred to as a first host, a second host, and a third host, respectively.

The primary main frame 80 is connected to the production storage device 40 via a network 101 which is, for example, a storage area network (SAN). The secondary main frame

90, the backup storage device 10, the verification storage device 30, and the open server 50 are connected to each other via a network 102 which is, for example, a storage area network (SAN). The open storage device 60 is connected to each of the backup storage device 10 and the verification storage device 30.

The primary main frame 80 includes control software 81 including an application programming interface (API) that exchanges data with the production storage device 40 via the network 101. The primary main frame 80 includes the control software 81 that controls the production storage device 40 when exchanging data with at least one host.

The secondary main frame 90 includes control software 91 including an application programming interface (API) that exchanges data with the backup storage device 10, the verification storage device 30, and the open server 50 via the network 102, and volume mapping information 92. The volume mapping information 92 will be described later. The secondary main frame 90 includes the control software 91 that controls the backup storage device 10 when exchanging data with at least one host.

The open server 50 is connected to the open storage device 60 through a network 103 that is, for example, a local area network (LAN). The open server 50 has a definition file in which configuration information of a volume such as an export volume 12 is defined.

The first host is connected to the production storage device 40 and makes an I/O request to a production volume 41 in order to store and read data in and from the production volume 41 of the production storage device 40. The production volume 41 stores data to be exchanged with the host. The production storage device 40 is a storage installed at a short distance from the first host and includes the production volume 41.

The backup storage device 10 is connected to the production storage device 40 and is installed, for example, at a place away from the production storage device 40. The backup storage device 10 includes a volume 13, a data area 14, a relay volume 15, and a virtual volume (not illustrated). The virtual volume (not illustrated) is a virtual volume virtually created as a sub-volume of the production volume 41 by shadow image (SI).

The relay volume 15 is a volume for relaying information desired to be transmitted between the open side and the main frame side. For example, the volume mapping information is written to the relay volume 15. The volume 13 and the data area 14 will be described later.

The backup storage device 10 is an example of a first storage device, and creates a backup image of the production volume 41 as an example of a predetermined volume on which data is read and written by an external device and stores the backup image in the data area 14.

In the backup storage device 10, for example, the data of the production volume 41 including unit volumes subdivided into, for example, four is copied to the backup storage device 10. For the copied data, for example, a backup image is created in the data area 14 by shadow image (SI). In the data area 14, a backup image is created according to the time point when the backup is acquired.

In the data area 14, information to be accessed from an external device is not provided to the external device, and the data area 14 is configured by a storage area which can be recognized by only the storage controller of the backup storage device 10. For example, in a case where the data area 14 includes a plurality of volumes, a volume ID necessary for accessing data may not be provided to the outside.

The backup image is a backup image at a different time point of the production volume 41. In order to create a backup image, for example, Thin Image that is saved in the data protection area 69 is used. However, another implementation method may be adopted as long as it is a function of acquiring data constituting the backup image. In addition, a backup function that can store data constituting a backup image in another volume may be used. Hereinafter, data including backup data at a predetermined time point may be referred to as a "backup image".

The open storage device 60 is an example of a second storage device, and accumulates backup images of a plurality of generations created at different time points with respect to the production volume 41 in the data protection area 69 inaccessible from an external device. The open storage device 60 includes an export volume 12, a mapping volume 12x, a data protection area 69, a management table volume 11, a verify-base-volume (hereinafter referred to as "VB volume") 61, and a verify-access-volume (hereinafter referred to as "VA volume") 62. The export volume 12 stores actual data of the backup image of each generation.

The export volume 12 is mapped with a virtual volume (not illustrated) and circumscribed volume mapping information, serves as a storage destination of data of the virtual volume (not illustrated), and stores a copy of data of the production volume 41.

In the present embodiment, for the data stored in the production volume 41, a virtual volume (not illustrated) paired with the production volume 41 is created in the backup storage device 10. The volume mapping information is registered with the virtual volume as a circumscribed source volume and the production volume 41 of the production storage device 40 as a circumscribed destination volume in the management table volume 11.

The data is copied from the production volume 41 via a virtual volume (not illustrated) to the export volume 12 asynchronously, for example. This circumscribed volume mapping information is used in a circumscribing function realized by a universal volume manager (UVM) provided by Hitachi, Ltd. (registered trademark), for example. The circumscribing function is a function of integrating a plurality of disk arrays of different models as if they were one disk array by a virtualization technology, for example, and is a function of being able to handle a plurality of disk arrays of different models as if they were one disk array by connecting an external storage device having a logical volume and mapping the logical volume.

As will be described later, the management table volume 11 stores management information such as backup data management information for managing a copy number assigned to each backup image, access VOL information regarding the configuration of the volume 13, association information between the copy number and the access volume, and access volume backup possible time zone information. The management table volume 11 records meta information for each backup generation. The meta information includes, for example, information regarding association of backup date and time, so-called snapshot pair information.

The VB volume 61 is a volume for storing a backup image to be subjected to data verification. The backup image stored in the VB volume 61 is a backup image, which is selected from a plurality of backup images accumulated in the data protection area 69, to be subjected to data verification.

The VA volume 62 is a volume on which the backup image of the VB volume 61 is copied one by one by, for example, a thin image (TI). Note that, in the present embodiment, the VA volume 62 is provided separately from the VB volume 61 in order to be read only when the backup image is read from the verification storage device 30 as described later from the viewpoint of security.

The VA volume 62 is associated with the virtual volume of the data protection area 35 of the verification storage device 30 by, for example, the UVM. The VA volume 62 is one large-capacity volume, but the virtual volume functions as, for example, four unit volumes obtained by dividing the one volume. The backup image of a specific generation stored in the VA volume 62 can be referred to as a backup image of a specific generation of the virtual volume 34.

On the other hand, the open storage device 60 includes the mapping volume 12x which stores volume mapping information corresponding to the export volume 12, a mapping volume 61x which stores volume mapping information corresponding to the VB volume 61, and a volume 62x which stores volume mapping information corresponding to the VA volume 62.

Here, in the present embodiment, the actual data constituting the backup image of the data area 14 exists in the export volume 12 of the open storage device 60. The export volume 12 is associated with the volume 13 of the data area 14 by, for example, the UVM.

In the present embodiment, for the data stored in the export volume 12, the volume 13 is created as a virtual volume paired with the export volume 12 in the backup storage device 10. The volume mapping information is registered with the volume 13 as a circumscribed source volume and the export volume 12 of the open storage device 60 as a circumscribed destination volume in the management table volume 11.

That is, in the present embodiment, the backup image at a specific time point (specific generation) is provided to (the export volume 12 of) the open storage device 60 by associating the backup image at the specific time point (specific generation) with the volume 13. This association is an operation of associating a backup image at a specific time point (specific generation) of the export volume 12 with the volume 13 and providing the associated backup image by the volume 13. This operation is executed, for example, when the backup storage device 10 receives a command from the second host.

Note that since the data constituting the backup image of the volume 13 is stored in the export volume 12 of the open storage device 60, the access is generally slower than the access to the production volume 41.

As described above, in the present embodiment, the backup storage device 10 creates a backup image of the production volume 41 on which data is read and written by an external device (host) and stores the backup image in the data area 14.

The above-described export volume 12 is, for example, a large-capacity volume, is mapped with the volume 13 and the circumscribed volume mapping information, and is a storage destination of the actual data of the volume 13. The export volume 12 uses, for example, a circumscribing function called a universal volume mapping (UVM) to provide the backup storage device 10 with four unit volumes obtained by subdividing the large-capacity volume.

In the data protection area 69, the backup image of each generation acquired by acquiring the backup data created at each time point one by one, for example, a thin image (TI) is accumulated in the export volume 12, whereby the backup images of a plurality of generations are accumulated. The data protection area 69 cannot be accessed from an external device. Details of the data protection area 69 will be described later.

The mapping volume 12x stores each volume mapping information corresponding to the backup image of each generation.

The open server 50 is an example of the control device, and extracts summary information regarding an outline of the production volume 41 from the volume mapping information regarding the configuration of the production volume 41 at a time point when each of the backup images of the plurality of generations is created, and acquires specific volume mapping information (for example, as will be described later, the number of unit volumes of the production volume 41 has been reduced to 2) of the production volume 41 corresponding to a specific backup generation selected on the basis of the summary information from the backup images of the plurality of generations.

The open server 50 acquires, via the relay volume 15, the volume mapping information of the backup target volume which is written to the relay volume 15 accompanying the backup, and writes the volume mapping information to the mapping volume of the open storage device 60. In the open storage device 60, there are backup images of a plurality of generations, and a plurality of pieces of volume mapping information corresponding to the backup images of the plurality of generations are written to the mapping volume.

The open server 50 acquires the summary information from the management table of the management volume of the open storage device 60 so that the backup generation can be selected, and displays, on the GUI, information that allows the recognition of the volume configuration for each generation as described later.

In the open storage device 60, volume mapping information corresponding to the backup image of the selected generation among a plurality of pieces of volume mapping information managed in the management volume is allocated to the volume.

The open server 50 acquires the volume mapping information corresponding to the backup image of the selected generation from the open storage device 60 via the network 103, and stores the volume mapping information in the relay volume 15 of the backup storage device 10 via the SAN 102.

In the present embodiment, the open server 50 extracts, as the summary information, at least one of the number of unit volumes constituting the production volume 41 and the total capacity thereof from the volume mapping information regarding the configuration of the production volume 41 at the time point when each of the backup images of the plurality of generations is created.

Specifically, along with the process related to the backup image of the specific generation described above, the volume mapping information corresponding to the backup image of the specific generation is generated, and the summary information is extracted from the volume mapping information. Details of the process related to the generation of the summary information will be described later. That is, the summary information is extracted each time the backup images of the plurality of generations are created.

The open server 50 controls the entire backup. The open server 50 manages, for example, how many generations of backup images have been acquired. The open server 50 includes file conversion software 51 as software.

The file conversion software 51 has a function of transmitting information desired to be transmitted between the secondary main frame 90, the open server 50, and the open storage device 60, and a function of converting a file format.

Examples of the information desired to be transmitted include volume mapping information regarding the configuration of each volume at present or before, in addition to the backup schedule such as the start/end of the backup, for example.

The file conversion software 51 creates summary information from the volume mapping information corresponding to each backup image via the network 103 in the open storage device 60.

The storage management software 53 controls the open side, that is, the open server 50 and the open storage device 60. The storage management software 53 controls backup and data verification (and restoration), and controls start of backup, for example. The schedule of the backup is set in advance. The storage management software 53 stores the acquired information regarding the backup in the management table of the management table volume 11.

On the other hand, the open server 50 is an example of the control device, and verifies whether the volume configuration based on the backup image of the specific generation corresponding to the specific volume mapping information matches the volume configuration based on the current backup image of the production volume 41, and when both the volume configurations match each other as a result of the verification, verifies and recovers the backup data on the basis of the backup image of the specific generation. Hereinafter, a specific description will be given.

The verification storage device 30 includes the data protection area 35 inaccessible from an external device. The data protection area 35 includes a virtual volume 32 to be described later. In the virtual volume 32, for example, the actual data stored in the VA volume 62 to be described later is copied by the UVM. The data is data to be subjected to data verification to be described later.

In the present embodiment, for the data stored in the VA volume 62, the virtual volume 32 paired with the VA volume 62 is created in the verification storage device 30. The volume mapping information is registered with the virtual volume 32 as a circumscribed source volume and the VA volume 62 of the open storage device 60 as a circumscribed destination volume in the management table volume 11.

The open server 50 performs data verification on whether the backup image of the specific generation of the virtual volume (not illustrated) has the same volume configuration as the backup image to be subjected to data verification. Note that the actual data of the backup image to be subjected to the data verification is stored in the VA volume 62.

In a case where the volume configuration is the same, the open server 50 copies the backup image of the specific generation of the virtual volume by, for example, the above-described SI (shadow image) and restores the backup image as backup data, and in a case where the volume configuration is not the same, the open server 50 determines that the data authentication has an error, and for example, does not restore the backup data or notifies that the backup data is not to be restored.

Note that in the present embodiment, in a case where both the volume configurations do not match each other as a result of the data verification, the open storage device 60 may notify the copy number of the unit volume of which the volume configurations do not match each other, and may select only a part of the unit volumes of which the volume configurations match each other.

<Hardware Configuration>

Figure 2:
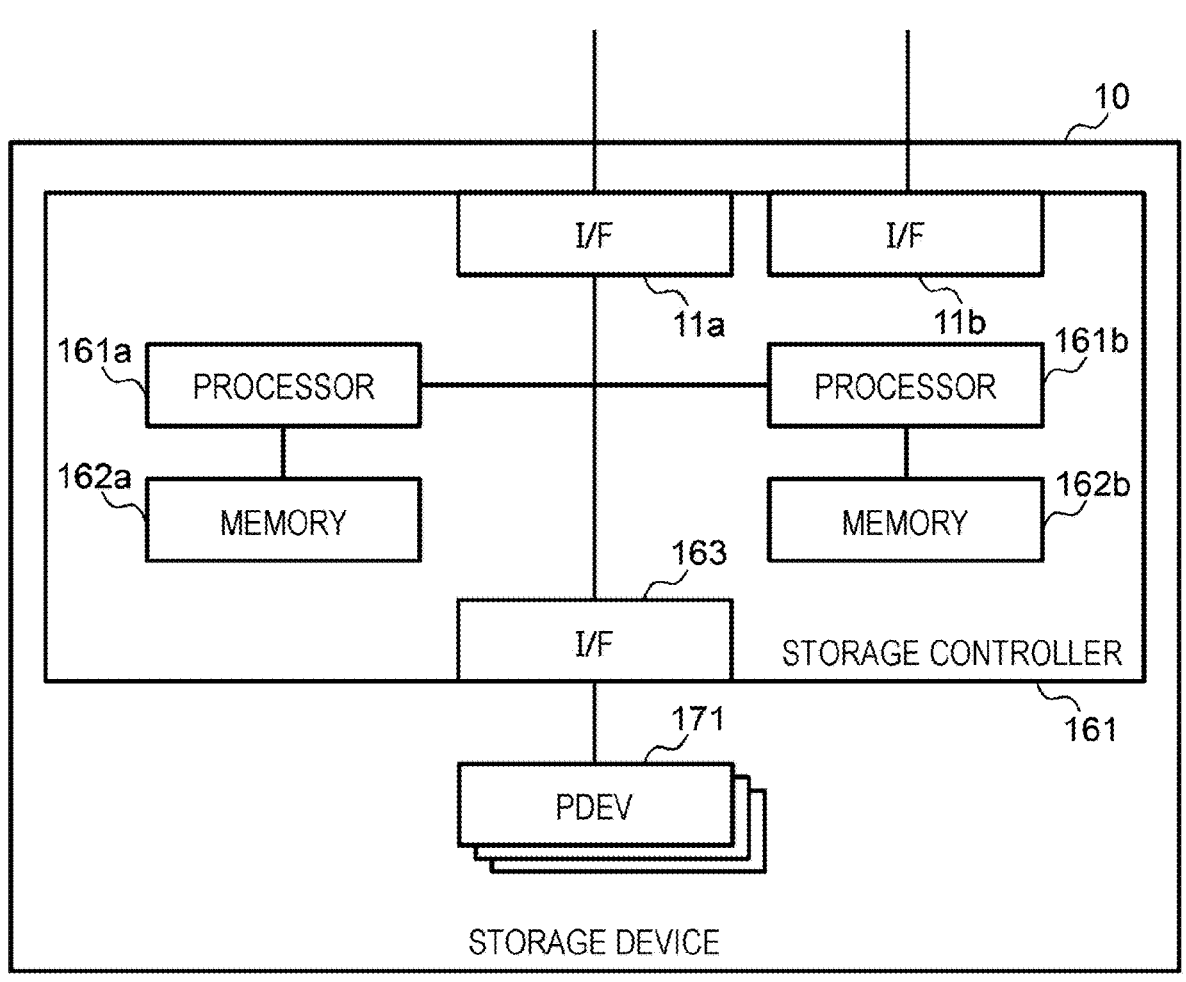

FIG. 2 is a block diagram illustrating an example of a hardware block configuration of a storage device or the like. The storage device or the like includes the backup storage device 10, the verification storage device 30, the production storage device 40, and the open storage device 60 illustrated in FIG. 1.

In FIG. 2, the backup storage device 10 will be described as an example, but other storage devices have a similar configuration. The backup storage device 10 includes a PDEV 171 that is a plurality of (or one) physical storage devices and a storage controller 161 connected to the PDEV 171.

The storage controller 161 includes an I/F 11a, an I/F 11b, an I/F 163, a memory 162, and a processor 161a connected thereto. The I/F 11a, the I/F 11b, and the I/F 163 are examples of the interface unit. The memory 162 is an example of the storage unit. The processor 161a is an example of the processor unit.

The I/F 11a is a communication interface device that mediates exchange of data between the first host or the external storage device and the storage controller 161. The first host, the external storage device, and the like are connected to the I/F 11a via a Fibre Channel (FC) network.

The first host, the external storage device, and the like transmit an I/O request (write request or read request) designating an I/O destination (for example, a logical volume number such as a logical unit number (LUN) or a logical address such as a logical block address (LBA)) to the storage controller 161.

The I/F 11b is a communication interface device that mediates exchange of data between the second host and the storage controller 161. The second host is connected to the I/F 11b via an Internet Protocol (IP) network.

The FC network and the IP network may be the same communication network. The second host manages the backup storage device 10.

The I/F 163 is a communication interface device that mediates exchange of data between the plurality of PDEVs 171 and the storage controller 161. A plurality of PDEVs 171 are connected to the I/F 163.

The memory 162 stores a program executed by the processor 161a and data used by the processor 161a. The processor 161a executes a program stored in the memory 162. For example, a set of the memory 162 and the processor 161a is duplicated.

FIG. 3 is a diagram illustrating an example of volume mapping information corresponding to a volume configuration. In the illustrated example, the volume mapping information is, for example, information for managing a correspondence relationship between the export volume 12 of the open storage device 60 and the volume 13 of the backup storage device 10.

The volume mapping information includes a backup acquisition date and time, an open storage volume identifier (ID), and a main frame storage volume identifier (ID). The open storage volume ID indicates a volume ID of the export volume 12 in the open storage device 60. The main frame storage ID indicates a volume ID of the volume 13 in the backup storage device 10.

For example, in the backup acquired at the backup acquisition date and time of 9:00:00 on Jan. 1, 2022, the volume mapping information is as shown in the following example. Specifically, the volume IDs "1001", "1002", "1003", and "1004" of the volume 13 of the backup storage device 10 correspond to the volume ID "101" of the export volume 12 of the open storage device 60.

FIG. 4 is a diagram illustrating an example of a management table of the management table volume 11. The management table includes a storage ID, a volume ID, . . . , a backup acquisition date and time, . . . , the number of volumes on the main frame side, and the total capacity thereof.

The storage ID is an ID for identifying a plurality of storage devices and the like from each other. The volume ID is an ID for distinguishing volumes from each other. The number of volumes on the main frame side indicates the number of volumes on the main frame side (illustrated "main frame volume"), and the total capacity indicates the total value of the capacities of all the volumes on the main frame side.

For example, the volume ID "101" of the storage ID "800000020000" of the open storage device 60 is associated with the backup acquisition date and time of "9:00:00 on Jan. 1, 2022", "9:00:00 on Jan. 3, 2022", and "9:00:00 on Jan. 5, 2022". In the backup acquired at the backup acquisition date and time, for example, the number of volumes on the main frame side is 2000, 4000, and 6000, and the total capacities thereof are 2 [TB], 4 [TB], and 6 [TB], respectively.

In the present embodiment, the following correspondence relationship is established. That is, the volume IDs "1001", "1002", "1003", and "1004" of the volume 13 (13a) in the backup storage device 10 correspond to the volume ID "101" of the export volume 12 (12a) of the open storage device 60. The volume IDs "2001", "2002", "2003", and "2004" of the volume 13 (13b) in the backup storage device 10 correspond to the volume ID "102" of the export volume 12 (12b) of the open storage device 60. The volume IDs "3001", "3002", "3003", and "3004" of the volume 13 (13c) in the backup storage device 10 correspond to the volume ID "103" of the export volume 12 (12a) of the open storage device 60.

Figure 5:
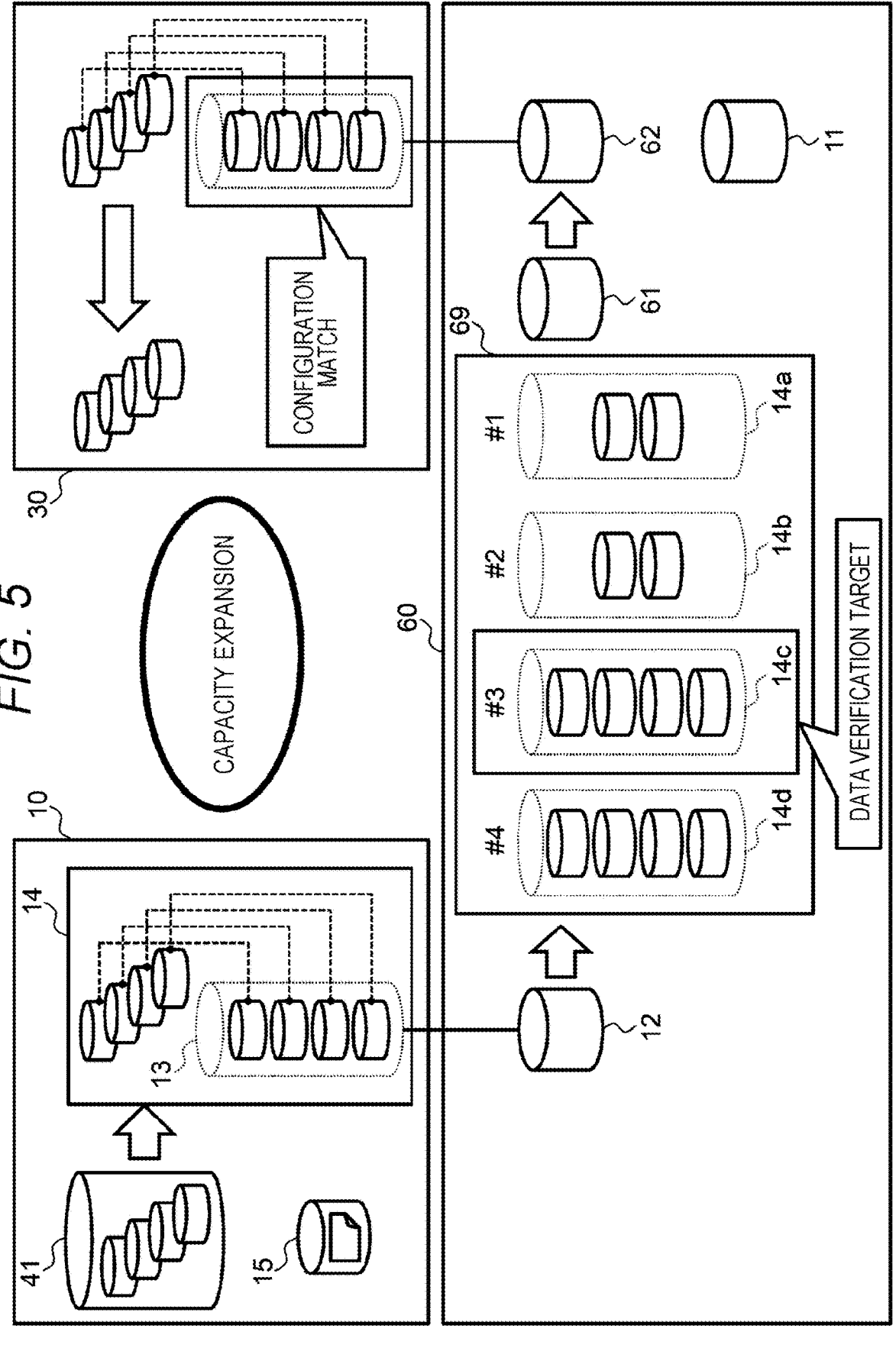
FIG. 5 is a diagram illustrating an example of data verification in a case where capacity expansion of a volume is performed.

FIG. 5 is a diagram illustrating an example of data verification in a case where capacity expansion of a volume is performed during a system operation. The illustrated example illustrates an example of a case where the capacity of the production volume 41 including two unit volumes is expanded to four unit volumes in the middle of the backup cycle during the system operation.

A backup image acquired at each time point is accumulated in the export volume 12 of the open storage device 60. In the open storage device 60, backup images acquired at different time points are continuously accumulated in the data protection area 69. In the data protection area 69, for example, backup images 14a to 14d of a plurality of generations are accumulated. In the illustrated example, as an example, the backup images 14a to 14d of four generations are accumulated so as to be the latest to the oldest from the left to the right.

The backup images 14a to 14d are given copy numbers as follows. A copy number #1 is assigned to the backup image 14a, a copy number #2 is assigned to the backup image 14b, a copy number #3 is assigned to the backup image 14c, and a copy number #4 is assigned to the backup image 14d.

For example, when creating the backup images 14a, 14b, 14c, and 14d, the storage controller of the backup storage device 10 assigns a copy number representing the backup generation described above to each of the backup images 14a, 14b, 14c, and 14d according to an instruction from the host, for example, and manages the backup images in the backup data management information of the management table volume 11. Each of the backup images 14a, 14b, 14c, and 14d is a backup image at a designated different time point of the export volume 12, and thus is also collectively referred to as "backup generation" or simply"generation" in the present embodiment.

In a case where the volume configuration of the backup image (in the illustrated example, for example, the backup image 14c assigned with the copy number #3) to be subjected to data verification matches the current volume configuration of the production volume 41, the verification storage device 30 restores the backup data on the basis of the backup image to be subjected to the data verification.

The data replication system has the above configuration, and an operation example thereof will be described next. First, an outline of a data replication method by the data replication system will be described.

The data replication method includes: a storage step in which the backup storage device 10 as an example of the first storage device creates a backup image of the production volume 41 as an example of the predetermined volume on which data is read and written by an external device; an accumulation step in which the open storage device 60 as an example of the second storage device accumulates backup images of a plurality of generations created at different time points with respect to the production volume 41 in the data protection area 69 inaccessible from the external device; a summary information extraction step in which the open server 50 as an example of the control device extracts summary information regarding an outline of the production volume 41 from volume mapping information regarding a configuration of the production volume 41 at a time point when each of the backup images of the plurality of generations is created; an acquisition step in which the open server 50 acquires specific volume mapping information of the production volume 41 corresponding to a specific backup generation selected from the backup images of the plurality of generations on the basis of the summary information; and a data verification and recovery step in which the open server 50 as an example of the control device verifies whether a volume configuration based on the backup image of the specific generation corresponding to the specific volume mapping information matches a volume configuration based on a current backup image of the volume 13 on which a current state of the production volume 41 is reflected, and when both the volume configurations match each other as a result of the verification, verifies and recovers backup data on the basis of the backup image of the specific generation. Hereinafter, a specific description will be given.

Figure 6:
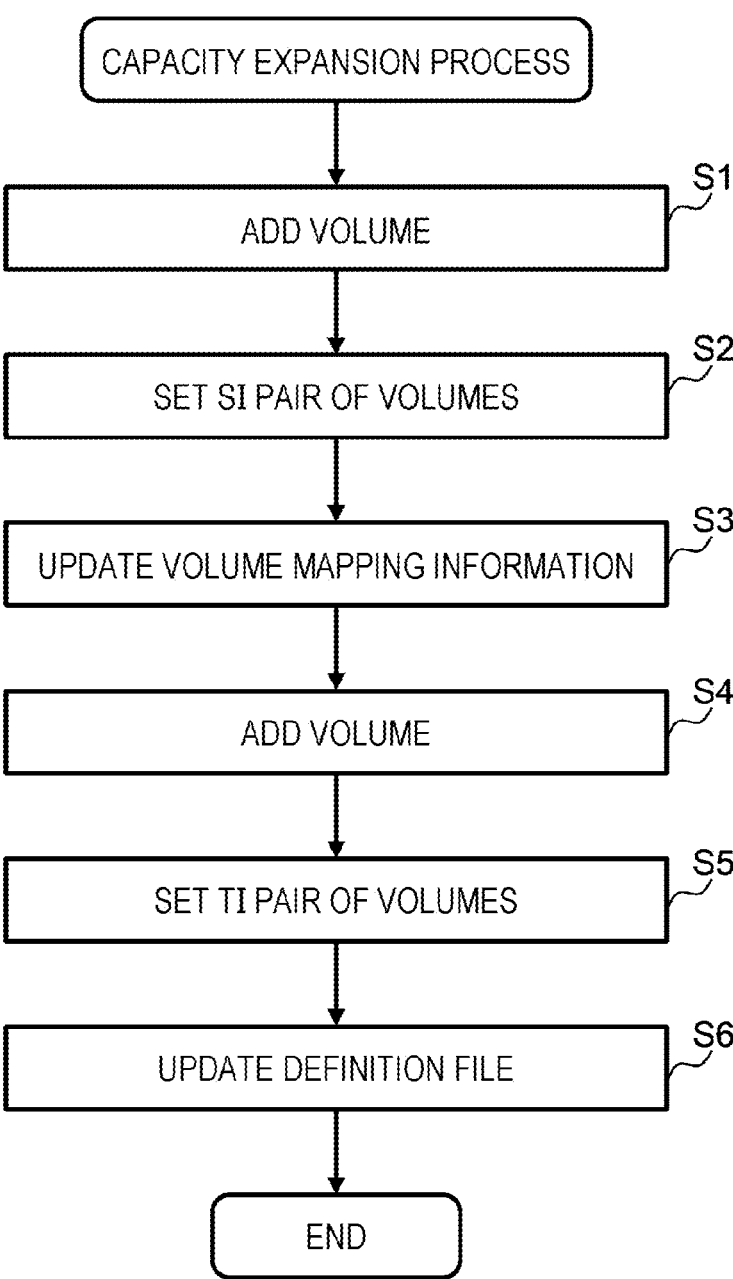
FIG. 6 is a flowchart illustrating an example of a procedure of a capacity expansion process.

FIG. 6 is a flowchart illustrating an example of a procedure of a capacity expansion process. On the main frame side, when the capacity of the volume is expanded, the volume configuration is updated using the above-described circumscribing function. On the other hand, on the open side, the capacity expansion of the volume and the definition file related to the volume are updated.

In step S1, in the production storage device 40, for example, two more unit volumes are added to the production volume 41 including two unit volumes in the middle of the backup cycle. In step S2, the backup storage device 10 sets a shadow image (SI) pair of volumes. Accordingly, in the backup storage device 10, the data of the production volume 41 is copied to a virtual volume (not illustrated).

In step S3, for example, the secondary main frame 90 updates the volume mapping information of the management table volume 11 according to the change in the volume configuration described above.

In step S4, two unit volumes are added. When the unit volume is added, the following step S5 is executed, and when the unit volume is not added, the execution of the step S5 is omitted.

In step S5, the open storage device 60 sets a thin image (TI) pair of volumes. Accordingly, in the backup storage device 10, the data of the export volume 12 is acquired in the data protection area 69. In step S6, the open storage device 60 updates the definition file related to the volume.

Figure 7:
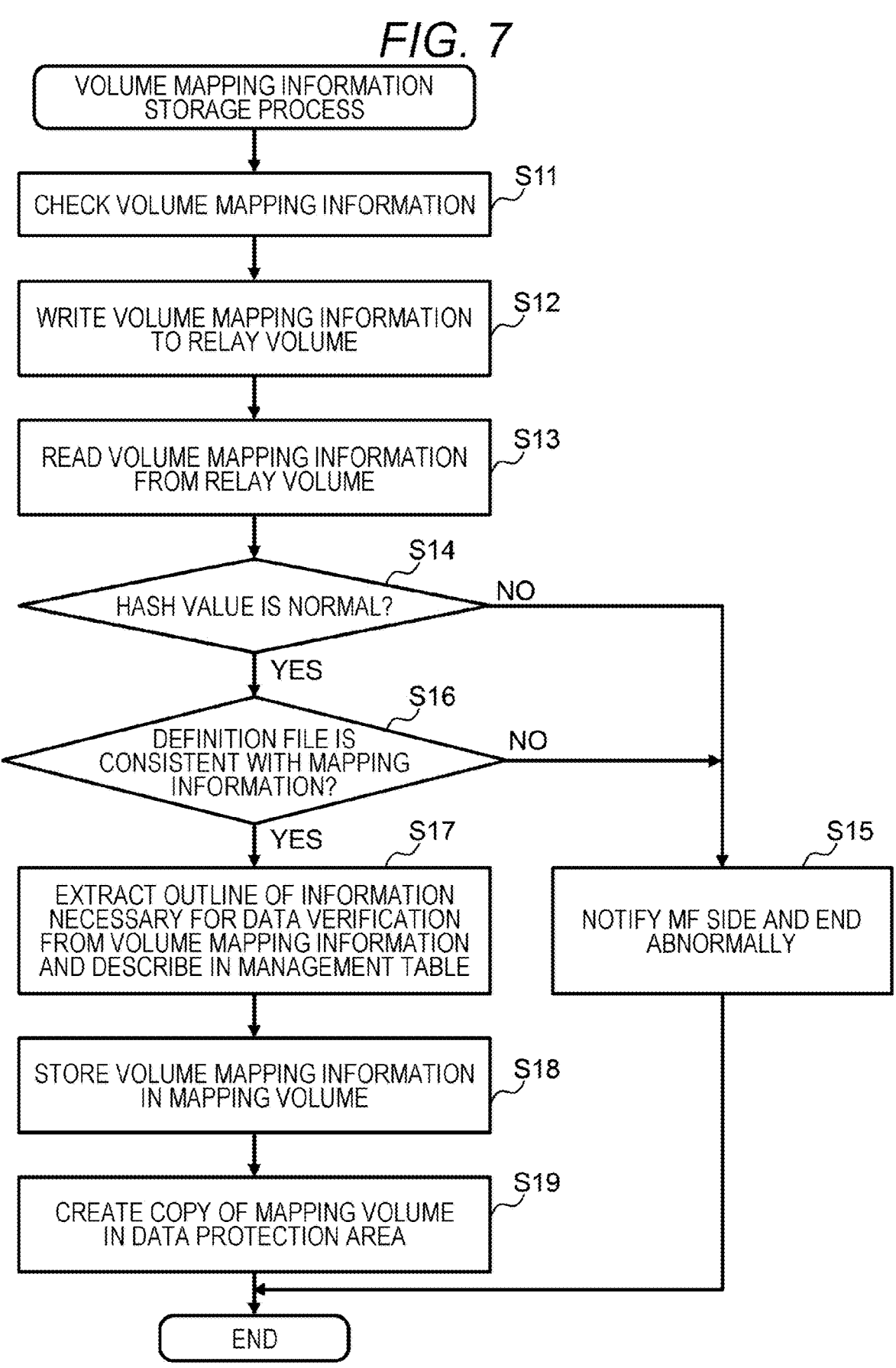
FIG. 7 is a flowchart illustrating an example of a procedure of a volume mapping information storage process.

FIG. 7 is a flowchart illustrating an example of a procedure of a volume mapping information storage process. The volume mapping information storage process is a process of acquiring volume configuration information regarding each volume, and is periodically executed, for example. As an execution timing, for example, the time of backup is assumed.

The volume mapping information storage process is executed under the control of the secondary main frame 90. In the volume mapping information storage process, the secondary main frame 90 writes the acquired volume mapping information to the relay volume 15, and the open server 50 stores the volume mapping information via the relay volume 15 in the mapping volume 12x of the open storage device 60. Hereinafter, a specific description will be given.

In step S11, the secondary main frame 90 checks the volume mapping information. In step S12, the secondary main frame 90 writes the volume mapping information to the relay volume 15.

In step S13, the open server 50 reads the volume mapping information from the relay volume 15. In step S14, the open server 50 determines whether a hash value is normal. Here, the hash value is, for example, a value calculated from data stored in the relay volume 15. In a case where the volume mapping information is passed from the secondary main frame 90 to the open server 50, the secondary main frame 90 automatically creates the hash value, and in a case where the volume mapping information is passed from the open server 50 to the secondary main frame 90, the open storage device 60 automatically creates the hash value.

If the hash value is not normal in step S14, the open server 50 notifies the secondary main frame 90 of the fact, and abnormally ends (step S15).

If the hash value is normal in step S14, the open server 50 determines whether the definition file defining the configuration information of the export volume 12 is consistent with the volume mapping information of the export volume 12 (step S16). Specifically, both the volume mapping information received from the secondary main frame 90 (main frame side) and the definition file of the open server 50 (open side) include the configuration information of the export volume 12, and thus consistency thereof is checked.

If the definition file is not consistent with the volume mapping information in step S16, the open server 50 executes step S14 described above. On the other hand, if the definition file is consistent with the volume mapping information in step S16, the open server 50 executes step S17. In step S17, the open server 50 extracts summary information as an outline of information necessary for data verification from the volume mapping information, and describes the summary information in a management table (hereinafter, also referred to as a "ledger") of the management table volume 11. Here, the volume mapping information actually includes a large number of types of configuration information, and it may be unnecessary to refer to all types of configuration information at the time of data verification. In this regard, in the present embodiment, for example, the summary information such as the number (and the total capacity) of volumes is extracted from the volume mapping information. The summary information is used, for example, at the time of data verification on the open side (open server 50).

In step S18, the open server 50 stores the volume mapping information corresponding to the backup image in the mapping volume 12x of the open storage device 60. In step S19, the open storage device 60 creates, for example, a copy of the mapping volume 12x in the data protection area 69 of the verification storage device 30.

Figure 8:
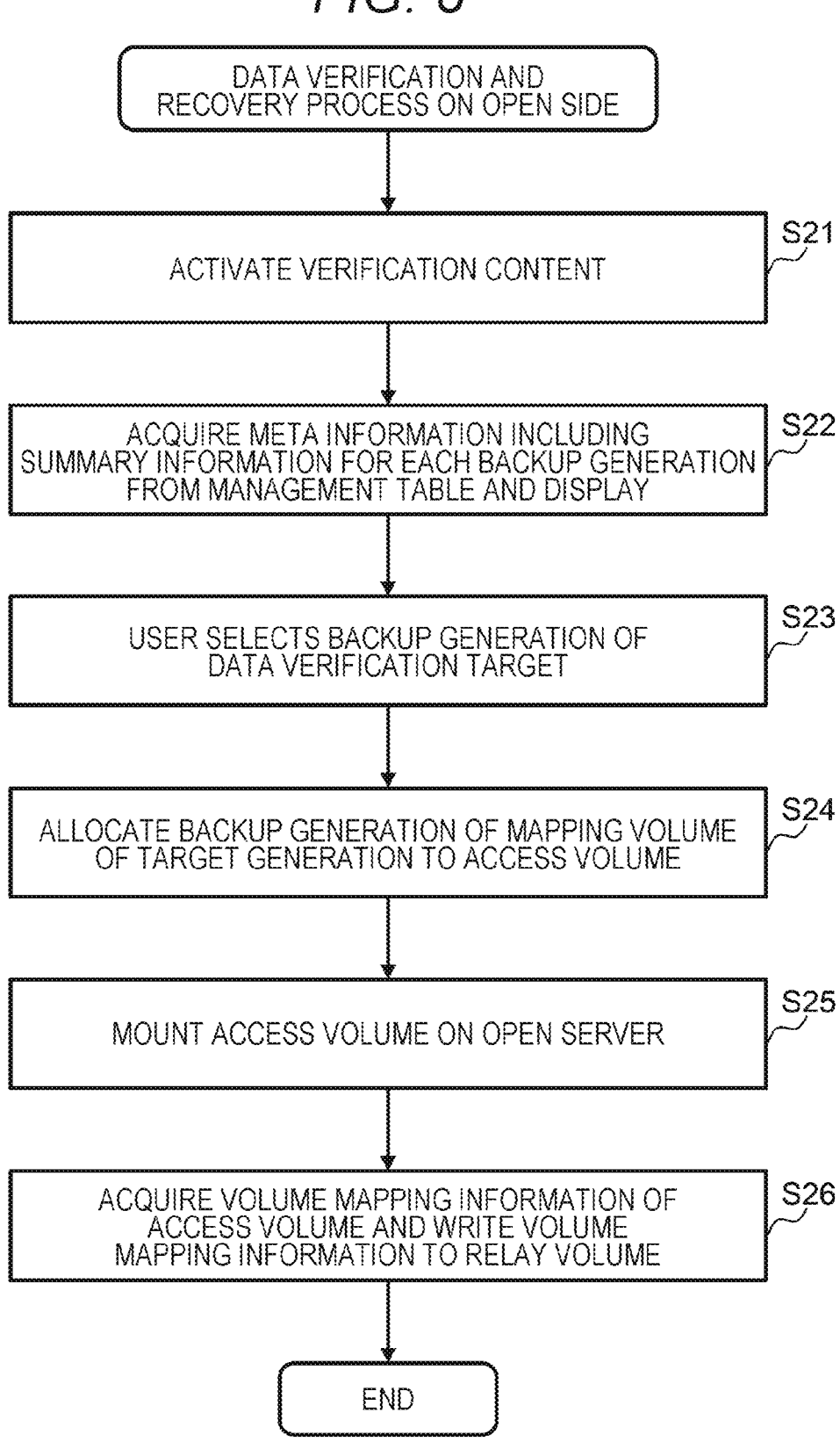
FIG. 8 is a flowchart illustrating an example of a procedure of a data verification and recovery process on an open side.

FIG. 8 is a flowchart illustrating an example of a procedure of a data verification and recovery process on the open side. In the data verification and recovery process, data to be verified is allocated to the volume by using verification content on the open side, so that verification work can be performed on the main frame side.

In step S21, in the open server 50, for example, the user activates the verification content. The verification content is, for example, the storage management software 53 of the open server 50 described above. Note that the reason why the verification content is used in this way is that the data verification work can also be performed on the main frame side by allocating the data to be data-verified to the volume by using the verification content on the open side.

In step S22, the open server 50 acquires meta information (including summary information) for each backup generation from the management table (ledger) of the management table volume 11, and displays an operation screen (hereinafter referred to as "backup generation selection screen") (not illustrated) related to a backup generation that can be a data verification target on the basis of the meta information for each backup generation. The user selects a backup generation (backup acquisition date and time) to be a data verification target on the backup generation selection screen. Note that the management table volume 11 can be directly accessed from the open server 50 via the network 103. Note that the management table volume 11 and the open server 50 are isolated from the production storage device 40 on the main frame side, and thus there is no risk of viral infection via the production storage device 40.

More specifically, in step S22, the storage management software 53 as an example of the verification content displays a tabular selection screen 200 including the summary information as illustrated in FIG. 10 on the backup generation selection screen described above. Specifically, the open server 50 displays backup images of a plurality of generations, and, overlaid on top of the backup images, displays the selection screen 200 for selecting one of the backup images of the plurality of generations.

That is, the open server 50 displays summary information when a backup image of a specific generation is selected as follows from backup images of a plurality of generations.

In step S23, in the open server 50, the user refers to the backup generation selection screen and selects a backup generation to be a data verification target. The backup generation is associated with the backup acquisition date and time.

In step S24, the open server 50 allocates the backup generation of the mapping volume 12x corresponding to the backup generation of the data verification target to the volume 62x as the access volume. The volume of the data verification target is specified on the basis of the volume mapping information from the main frame side. In the present embodiment, in a stage where the user selects the backup generation, the backup generation to be the data verification target can be known.

In step S25, the open server 50 mounts the volume 62x on the open server 50.

In step S26, the open server 50 acquires the volume mapping information of the volume 62x and writes the volume mapping information to the relay volume 15. Specifically, the open server 50 writes, to the relay volume 15, the volume mapping information of the volume of the data verification target selected on the open side. The volume mapping information is used when data verification and recovery are performed on the main frame side.

Figure 9:
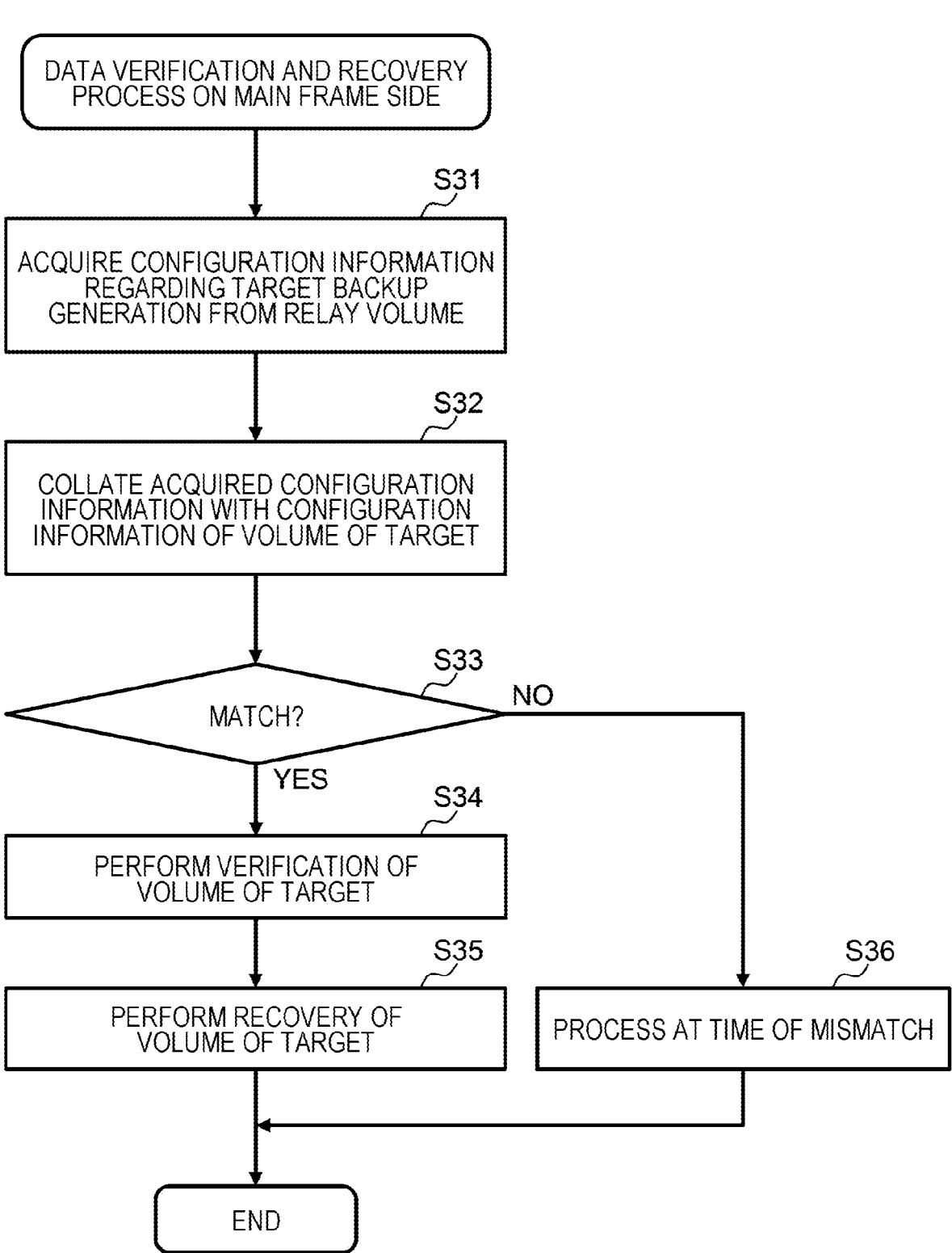
FIG. 9 is a flowchart illustrating an example of a procedure of the data verification and recovery process on a main frame side.

FIG. 9 is a flowchart illustrating an example of a procedure of the data verification and recovery process on the main frame side. In step S31, the secondary main frame 90 acquires, from the relay volume 15, the volume mapping information as the configuration information regarding the backup generation of the data verification target.

In step S32, the secondary main frame 90 collates the acquired configuration information with the configuration information of the volume of the target. As a result of the data verification in step S32, if both pieces of configuration information match each other, the secondary main frame 90 executes step S34, and when both pieces of configuration information do not match each other, the secondary main frame 90 executes step S36. In step S34, the secondary main frame 90 performs verification of the volume of the target (also referred to as "data verification"). In step S35, the secondary main frame 90 performs recovery of the volume of the target by the verification storage device 30. On the other hand, in step S36, the secondary main frame 90 executes a process at the time of mismatch. In this process at the time of mismatch, for example, the fact that both pieces of configuration information do not match is notified to the outside.

In this process at the time of mismatch, when both the volume configurations do not match each other, the verification storage device 30 (or the secondary main frame 90) displays the mismatched configuration on the display unit (not illustrated).

The data replication system according to the present embodiment includes: the backup storage device 10 as an example of the first storage device which creates a backup image of the production volume 41 as an example of the predetermined volume on which data is read and written by an external device and stores the backup image in the data area 14; the open storage device 60 as an example of the second storage device which accumulates backup images of a plurality of generations created at different time points with respect to the production volume 41 in the data protection area 69 inaccessible from the external device; and the open server 50 as an example of the control device which extracts summary information regarding an outline of the predetermined volume from volume mapping information regarding a configuration of the production volume 41 at a time point when each of the backup images of the plurality of generations is created, and acquires specific volume mapping information of the production volume 41 corresponding to a specific backup generation selected from the backup images of the plurality of generations on the basis of the summary information. The open server 50 verifies whether a volume configuration based on the backup image of the specific generation corresponding to the specific volume mapping information matches a volume configuration based on a current backup image of the production volume 41, and when both the volume configurations match each other as a result of the verification, verifies and recovers backup data on the basis of the backup image of the specific generation. Note that the open server 50 may include some functions of the secondary main frame 90.

The data replication method of the data replication system according to the present embodiment includes: a storage step in which the backup storage device 10 as an example of the first storage device creates a backup image of the production volume 41 as an example of the predetermined volume on which data is read and written by an external device and stores the backup image in the data area 14; an accumulation step in which the open storage device 60 as an example of the second storage device accumulates backup images of a plurality of generations created at different time points with respect to the production volume 41 in the data protection area 69 inaccessible from the external device; a summary information extraction step in which the open server 50 as an example of the control device extracts summary information regarding an outline of the production volume 41 from volume mapping information regarding a configuration of the production volume 41 at a time point when each of the backup images of the plurality of generations is created; an acquisition step in which the open server 50 acquires specific volume mapping information of the production volume 41 corresponding to a specific backup generation selected from the backup images of the plurality of generations on the basis of the summary information; and a data verification and recovery step in which the open server 50 verifies whether a volume configuration based on the backup image of the specific generation corresponding to the specific volume mapping information matches a volume configuration based on a current backup image of the production volume 41, and when both the volume configurations match each other as a result of the verification, verifies and recovers backup data on the basis of the backup image of the specific generation.

In this way, even in a case where the capacity of the production volume 41 is expanded in the middle of the backup cycle, the backup data can be recovered after the data verification. Therefore, since the capacity of the production volume 41 can be expanded during system operation, flexibility at the time of system construction is improved. For example, the user can calculate the total capacity of the backup data according to the requirements at the time of system introduction, start the operation with the minimum volume configuration, and expand the total capacity of the production volume 41 in the middle of the system operation.

In the present embodiment, the open server 50 extracts, as the summary information described above, at least one of the number of unit volumes constituting the production volume 41 and the total capacity thereof from the volume mapping information regarding the configuration of the production volume 41 at the time point when each of the backup images of the plurality of generations is created. In this way, the user can easily select a backup image of a specific generation from backup images of a plurality of generations with reference to summary information, which can be easily grasped, such as the number of unit volumes.

In the present embodiment, the open server 50 displays backup images of a plurality of generations and displays a selection screen for selecting one of the backup images of the plurality of generations. In this way, the user can easily select a backup image of a specific generation from backup images of a plurality of generations.

In the present embodiment, when a backup image of a specific generation is selected from backup images of a plurality of generations, the open server 50 displays summary information, for example, overlaid on the selection screen described above. In this way, the user can easily select a backup image of a specific generation from backup images of a plurality of generations with reference to the summary information.

The data replication system according to the present embodiment includes a display unit (not illustrated) which displays a mismatched configuration when both the volume configurations do not match in the above-described process at the time of mismatch. In this way, the user can re-select the backup image generation again in consideration of the mismatched configuration.

(2) Second Embodiment

Since a data replication system according to a second embodiment has substantially the same configuration and operation as those of the data replication system according to the first embodiment, the description of the same configuration and operation will be omitted, and different points will be mainly described below. In the second embodiment, unlike the first embodiment, the concept of grouping is adopted for the volume.

Figure 11:
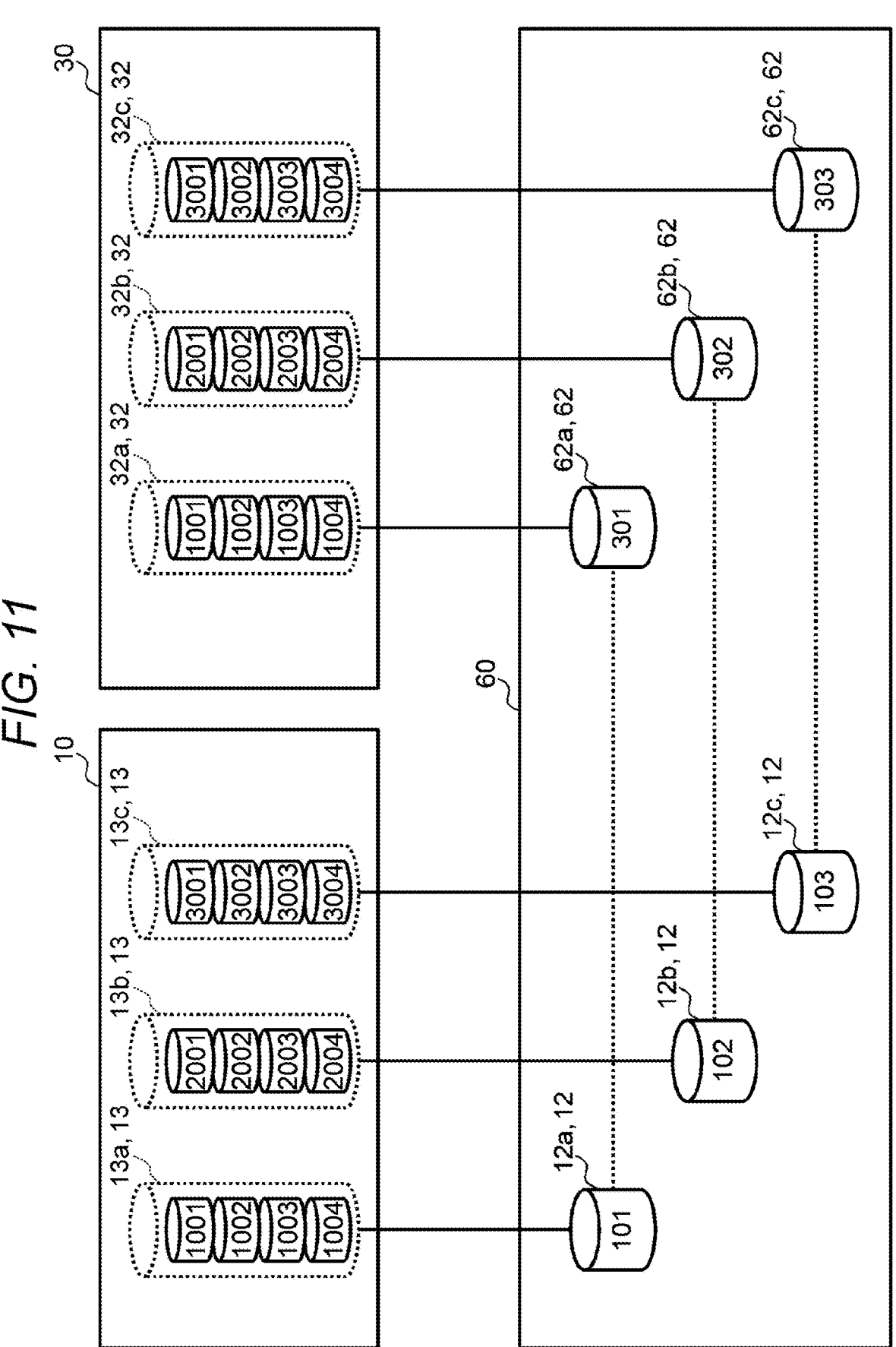
FIG. 11 is a diagram illustrating an example of a volume configuration in a data replication system according to a second embodiment.

FIG. 11 is a diagram illustrating an example of a volume configuration in the data replication system according to the second embodiment. The backup storage device 10 holds, as the configuration information of the UVM described above, volume mapping information for associating a volume on the main frame side and a volume on the open side.

In the illustrated example, the open storage device 60 has the export volume 12a to the export volume 12c and a first VA volume 62a to a third VA volume 62c acquired at different time points. Note that the export volume 12a to the export volume 12c correspond to the above-described export volume 12, and the first VA volume 62a to the third VA volume 62c correspond to the above-described VA volume 62. Note that the illustrated example illustrates a case where three export volumes 12a to 12c are set to one policy group.

The export volume 12a having the volume ID "101" in the open storage device 60 corresponds to the volume 13a including the unit volumes having the volume IDs "1001", "1002", "1003", and "1004" in the backup storage device 10 by the above-described circumscribing function.

The export volume 12b having the volume ID "102" in the open storage device 60 corresponds to the volume 13b including the unit volumes having the volume IDs "2001", "2002", "2003", and "2004" in the backup storage device 10 by the above-described circumscribing function.

The export volume 12c having the volume ID "103" in the open storage device 60 corresponds to the volume 13c including the unit volumes having the volume IDs "1001", "1002", "1003", and "1004" in the backup storage device 10 by the above-described circumscribing function. Note that the volumes 13a to 13c correspond to the above-described volume 13.

The first VA volume 62a having the volume ID "301" in the open storage device 60 corresponds to a virtual volume 32a including the unit volumes having the volume IDs "1001", "1002", "1003", and "1004" in the verification storage device 30 by the above-described circumscribing function.

The second VA volume 62b having the volume ID "302" in the open storage device 60 corresponds to a virtual volume 32b including the unit volumes having the volume IDs "2001", "2002", "2003", and "2004" in the verification storage device 30 by the above-described circumscribing function.

The third VA volume 62c having the volume ID "303" in the open storage device 60 corresponds to the virtual volume 32c including the unit volumes having the volume IDs "1001", "1002", "1003", and "1004" in the verification storage device 30 by the above-described circumscribing function. Note that the virtual volumes 32a to 32c correspond to the virtual volume 32 described above.

Figure 12:
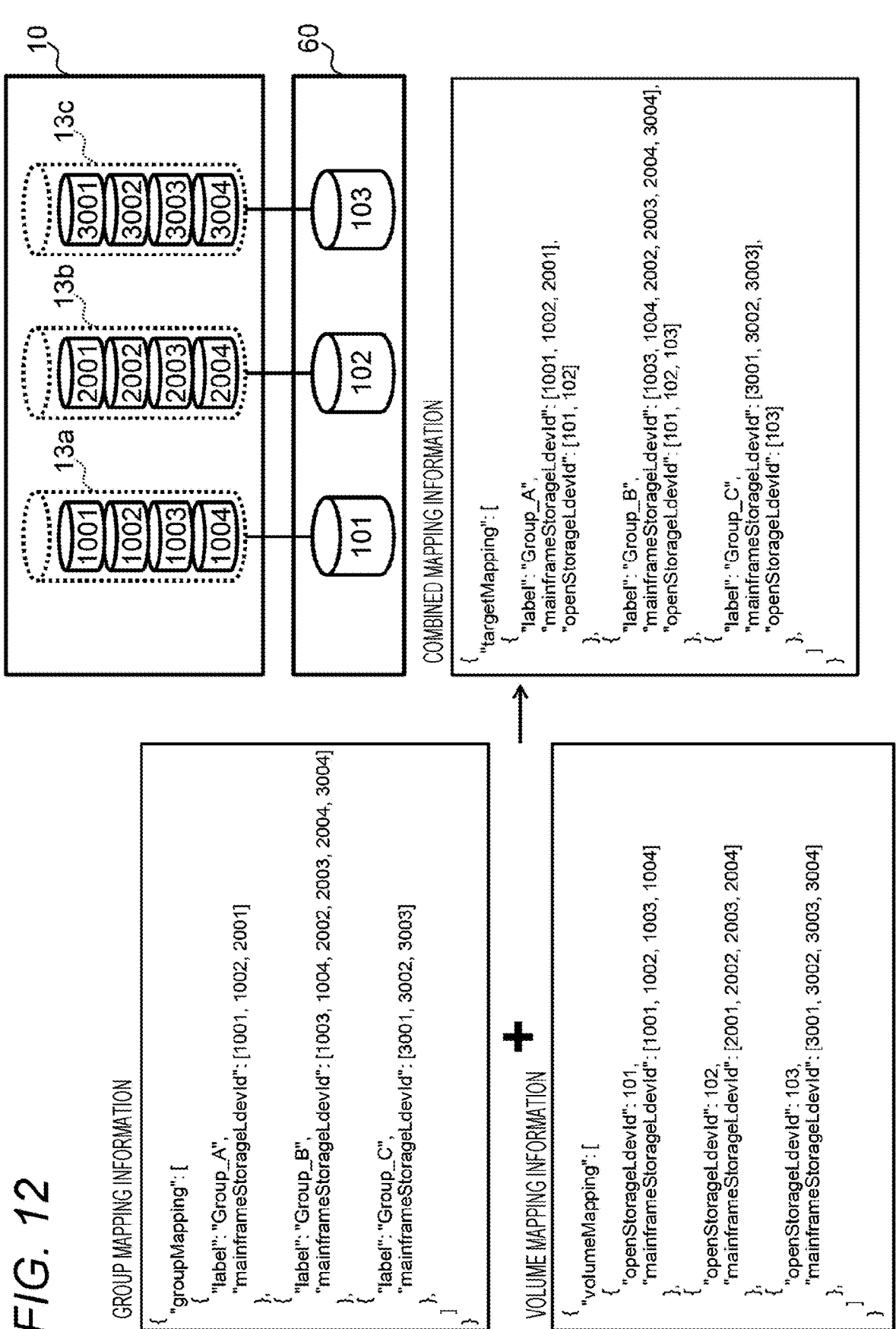
FIG. 12 is a diagram illustrating an example of information used in the volume configuration illustrated in FIG. 11.

FIG. 12 is a diagram illustrating an example of information used in the volume configuration illustrated in FIG. 11. In the first embodiment, the volume mapping information is used, whereas in the second embodiment, in order to perform the above-described grouping, combined mapping information created by combining the following group mapping information is used for the volume mapping information.

In the second embodiment, the secondary main frame 90 combines the following group mapping information with the volume mapping information (see the lower left side of FIG. 12). In the illustrated group mapping information, for example, as illustrated on the upper left side of FIG. 12, a group A includes unit volumes having volume IDs "1001", "1002", and "2001", a group B includes unit volumes having volume IDs "1003", "1004", "2002", "2003", "2004", and "3004", and a group C includes unit volumes having volume IDs "3001", "3002", and "3003".

The open server 50 (or both the main frame side and the open server 50) combines the group mapping information with the volume mapping information described above, and creates the following combined mapping information. That is, the combined mapping information indicates which unit volume of the volume 13 and which export volume 12 are included for each group.

More specifically, as illustrated on the lower right side of FIG. 12, the combined mapping information indicates that the group A includes the unit volumes of the volumes 13 having the volume IDs "1001", "1002", and "2001" and includes the export volumes 12 having the volume IDs "101" and "102", the group B includes the unit volumes of the volumes 13 having the volume IDs "1003", "1004", "2002", "2003", "2004", and "3004" and includes the export volumes 12 having the volume IDs "101", "102", and "103", and the group C includes the unit volumes of the volumes 13 having the volume IDs "3001", "3002", and "3003" and includes the export volume 12 having the volume ID "103".

FIG. 13 is a diagram illustrating an example of the group mapping information illustrated in FIG. 12. The group mapping information includes a group label and a main frame storage ID for each backup acquisition date and time. The main frame storage ID indicates the volume ID of the volume 13 of the backup storage device 10 on the main frame side.

In the illustrated example, as described above, for the backup acquisition date and time "9:00:00 on Jan. 1, 2022", it is defined that the group A includes the unit volumes having the volume IDs "1001", "1002", and "2001", the group B includes the unit volumes having the volume IDs "1003", "1004", "2002", "2003", "2004", and "3004", and the group C includes the unit volumes having the volume IDs "3001", "3002", and "3003".

FIG. 14 is a diagram illustrating an example of combined mapping information illustrated in FIG. 12. The combined mapping information includes a group label, a main frame storage ID, and an open storage volume ID for each backup acquisition date and time. The main frame storage ID indicates the volume ID of the volume 13 of the backup storage device 10 on the main frame side. The open storage volume ID indicates a volume ID of the export volume 12 of the open storage device 60.

In the illustrated example, as described above, for the backup acquisition date and time "9:00:00 on Jan. 1, 2022", it is defined that the group A includes the unit volumes of the volumes 13 having the volume IDs "1001", "1002", and "2001", and includes the export volumes 12 having the volume IDs "101" and "102", the group B includes the unit volumes of the volumes 13 having the volume IDs "1003", "1004", "2002", "2003", "2004", and "3004" and includes the export volumes 12 having the volume IDs "101", "102", and "103", and the group C includes the unit volumes of the volumes 13 having the volume IDs "3001", "3002", and "3003" and includes the export volume 12 having the volume ID "103".

In the present embodiment, the production volume 41 includes a plurality of volumes. The open server 50 manages a plurality of volumes by dividing the volumes into at least one group. The open server 50 extracts summary information regarding an outline of at least one volume included in the group, acquires specific volume mapping information of the production volume 41 corresponding to a specific backup generation selected on the basis of the summary information from backup images of a plurality of generations, and displays the summary information as described later when a backup image of a specific generation is selected from the backup images of the plurality of generations.

Figure 15:
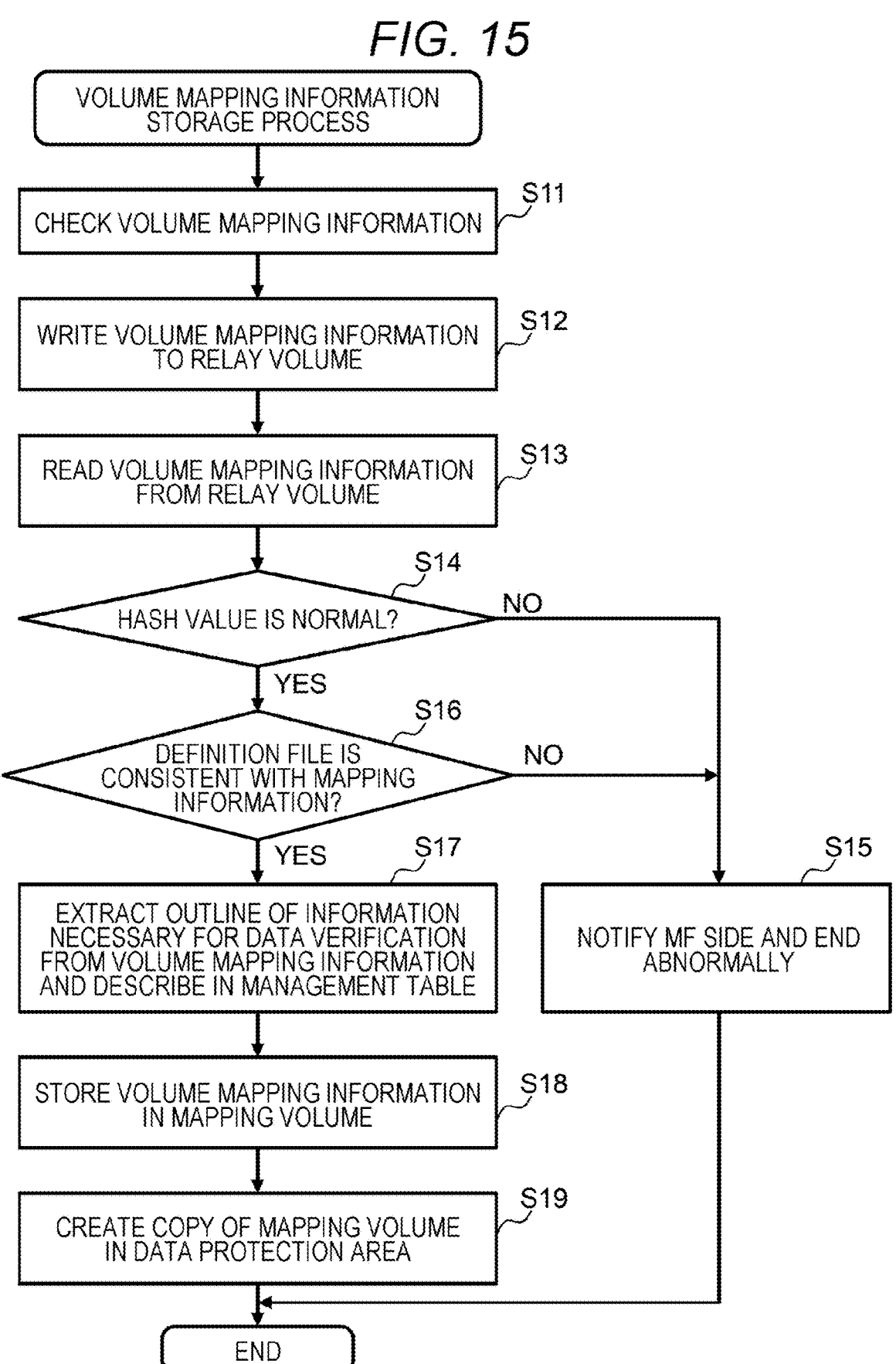
FIG. 15 is a flowchart illustrating an example of a procedure of a volume mapping information storage process according to the second embodiment.

FIG. 15 is a flowchart illustrating an example of a procedure of a volume mapping information storage process according to the second embodiment. The illustrated flowchart corresponds to the flowchart illustrated in FIG. 7 in the first embodiment. The flowchart illustrated in FIG. 15 is different from the flowchart illustrated in FIG. 7 in the first embodiment mainly in the process content of step S11.

In step S11, the secondary main frame 90 on the main frame side checks the volume mapping information. Specifically, the secondary main frame 90 checks whether the volume mapping information is consistent with the volume ID on the main frame side included in the group mapping information.

Steps S12 to S19 are substantially the same as those of the first embodiment, but in step S17, the open server 50 extracts, from the volume mapping information, summary information regarding an outline of at least one volume included in the group and registers the summary information in the management table of the management table volume 11. In addition, in step S18, at this stage, the open server 50 does not combine the volume mapping information and the group mapping information, and stores the volume mapping information and the group mapping information in their respective formats in the mapping volume 12x. Note that the volume mapping and the group mapping are combined on the open side (in the open server 50) at the time of data verification.

FIG. 16 is a flowchart illustrating an example of a procedure of a data verification and recovery process on the open side. The flowchart illustrated in FIG. 16 corresponds to the flowchart illustrated in FIG. 8 in the first embodiment. Note that steps S21,S22,S23,S24,S25, and S26 are the same as those in the first embodiment, and thus description thereof is omitted unless otherwise specified.

Steps S21 and S22 are the same as those in the first embodiment. Accordingly, similarly to the first embodiment, a backup generation selection screen (not illustrated) is displayed. The user selects a backup generation (backup acquisition date and time) to be a data verification target on the backup generation selection screen.

In step S22A, the open server 50 (or both the main frame side and the open server 50) combines the volumes of the data verification target in units of groups on the basis of the volume mapping information. Specifically, the secondary main frame 90 combines the group mapping information and the volume mapping information, and generates combined mapping information necessary for data verification on the open side.

As described above, when the user selects a specific backup generation on the backup generation selection screen, the open server 50 displays the group selection screen 201 illustrated in FIG. 17 on the basis of the selected specific backup generation. The group selection screen 201 displays information regarding the volume included in the group corresponding to the specific backup generation.

Specifically, the group selection screen 201 displays group information including a check box 201a, a group label 201b of a group corresponding to the specific backup generation, a detailed description 201c related to the group, the number of export volumes 201d, the number of volumes 201e on the main frame side, and a total capacity 201f thereof.

In step S23A, in the open server 50, the user selects a group of the data verification target. Specifically, on the group selection screen 201, the user inputs a check mark in the check box 201a corresponding to a desired group to select the desired group. At this time, on the group selection screen 201, for example, at least one of the number of volumes 201e on the main frame side and the total capacity 201f thereof is displayed as the summary information acquired from the management table (ledger). In particular, on the basis of the summary information, the user determines which group is to be selected.

When the selection of the group information is completed, the open server 50 executes steps S24 to S26 as in the first embodiment. Note that in the second embodiment, in step S24, the open server 50 allocates the backup generation of the mapping volume 12x, which is a data verification target and corresponds to the group information, to the volume 62x.

In the present embodiment, the production volume 41 includes a plurality of volumes. The open server 50 manages a plurality of volumes by dividing the volumes into at least one group. The open server 50 extracts summary information regarding an outline of at least one volume included in the group, acquires specific volume mapping information of the production volume 41 corresponding to a specific backup generation selected on the basis of the summary information from backup images of a plurality of generations, and displays the summary information as described later when a backup image of a specific generation is selected from the backup images of the plurality of generations. When relevant volumes among the plurality of volumes constituting the production volume 41 are divided into groups in this way, the user can recover the backup data from the backup image of the specific generation while referring to the summary information of the relevant volumes.

Note that the present invention is not limited to the above-described embodiments, and includes various modifications and equivalent configurations within the spirit of the appended claims. For example, the above-described embodiments have been described in detail for easy understanding of the present invention, and the present invention is not necessarily limited to those having all the described configurations. In addition, each element described in parallel in the present embodiment may have an aspect in which at least one of the elements is connected in series to another element.

The present invention can be applied to, for example, a data replication system related to a technology for restoring backup data after data verification is performed.

What is claimed is:

1. A data replication system comprising:

a first storage device which creates a backup image of a predetermined volume on which data is read and written by an external device and stores the backup image in a data area;

a second storage device which accumulates backup images of a plurality of generations created at different time points with respect to the predetermined volume in a data protection area inaccessible from the external device; and a control device which extracts summary information regarding an outline of the predetermined volume from volume mapping information regarding a configuration of the predetermined volume at a time point when each of the backup images of the plurality of generations is created, and acquires specific volume mapping information of the predetermined volume corresponding to a specific backup generation selected from the backup images of the plurality of generations on a basis of the summary information, wherein the control device verifies whether a volume configuration based on a backup image of a specific generation, from the plurality of generations, corresponding to the specific volume mapping information matches a volume configuration based on a current backup image of the predetermined volume, and when both the volume configurations match each other as a result of the verification, verifies and recovers backup data on a basis of the backup image of the specific generation.

2. The data replication system according to claim 1, wherein the control device extracts, as the summary information, at least one of a number of unit volumes constituting the predetermined volume and a total capacity of the predetermined volume from the volume mapping information regarding the configuration of the predetermined volume at a time point when each of the backup images of the plurality of generations is created.

3. The data replication system according to claim 1, wherein the control device displays the backup images of the plurality of generations and displays a selection screen for selecting one of the backup images of the plurality of generations.

4. The data replication system according to claim 3, wherein the control device displays the summary information when the backup image of the specific generation is selected from the backup images of the plurality of generations.

5. The data replication system according to claim 1, comprising a display unit which displays a mismatched configuration when the both volume configurations do not match.

6. The data replication system according to claim 1, wherein the predetermined volume includes a plurality of volumes, and the control device manages the plurality of the volumes by dividing the volumes into at least one group, extracts the summary information regarding an outline of at least one of the volumes included in the group, and acquires specific volume mapping information of the predetermined volume corresponding to the specific backup generation selected from the backup images of the plurality of generations on the basis of the summary information, and displays the summary information when the backup image of the specific generation is selected from the backup images of the plurality of generations.

7. A data replication method comprising:

a storing step of creating, by a first storage device, a backup image of a predetermined volume on which data is read and written by an external device;

accumulating, by a second storage device, backup images of a plurality of generations created at different time points with respect to the predetermined volume in a data protection area inaccessible from the external device;

extracting, by a control device, summary information regarding an outline of the predetermined volume from volume mapping information regarding a configuration of the predetermined volume at a time point when each of the backup images of the plurality of generations is created; and acquiring, by a control device, specific volume mapping information of the predetermined volume corresponding to a specific backup generation selected from the backup images of the plurality of generations on a basis of the summary information, and wherein the control device verifies whether a volume configuration based on a backup image of a specific generation, from the plurality of generations, corresponding to the specific volume mapping information matches a volume configuration based on a current backup image of the predetermined volume, and when both the volume configurations match each other as a result of the verification, verifies and recovers backup data on a basis of the backup image of the specific generation.

* * * * *